(12) United States Patent
Kettula et al.

(10) Patent No.: US 11,407,134 B2
(45) Date of Patent: *Aug. 9, 2022

(54) FINISHED PRODUCTS FORMED FROM CUTTING CONVOLUTELY WOUND LOGS OF WEB MATERIALS

(71) Applicant: The Procter & Gamble Company, Cincinnati, OH (US)

(72) Inventors: Joseph Henry Kettula, Cincinnati, OH (US); Jonathan Lee Price, Cincinnati, OH (US); Victoria Grace Strain, Symmes Township, OH (US); Gustav Andre Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,380

(22) Filed: Jun. 18, 2021

(65) Prior Publication Data

US 2021/0308894 A1 Oct. 7, 2021

Related U.S. Application Data

(63) Continuation of application No. 15/834,735, filed on Dec. 7, 2017, now Pat. No. 11,065,776.

(Continued)

(51) Int. Cl.
*B26D 7/04* (2006.01)
*B26D 7/06* (2006.01)
(Continued)

(52) U.S. Cl.
CPC ............. *B26D 7/04* (2013.01); *B23D 47/042* (2013.01); *B26D 1/16* (2013.01); *B26D 1/565* (2013.01);
(Continued)

(58) Field of Classification Search
CPC ........ B23D 47/042; B26D 1/16; B26D 1/565; B26D 3/16; B26D 3/161; B26D 7/01;
(Continued)

(56) References Cited

U.S. PATENT DOCUMENTS

| 4,041,813 A | 8/1977 | Spencer |
| 5,038,647 A | 8/1991 | Biagiotti |

(Continued)

FOREIGN PATENT DOCUMENTS

WO 0141982 A2 6/2001

OTHER PUBLICATIONS

All Office Actions; U.S. Appl. No. 15/834,735, filed Dec. 7, 2017.

(Continued)

*Primary Examiner* — Christopher M Polley
*Assistant Examiner* — Sathavaram I Reddy
(74) *Attorney, Agent, or Firm* — Richard L. Alexander

(57) ABSTRACT

Described herein is an array of finished products, each finished product in said array may have a Percent Compressibility of greater than 3.00% and an actual length ranging from about 10.955 inches to about 11.045 inches. The finished products may be paper towels, where the actual length is different for at least two finished products of the array and where at least one of the finished products of the array of finished products may comprise a protruding core and where at least one of the finished products may comprise a hidden core, and where each of the finished products are in a package.

17 Claims, 9 Drawing Sheets

Related U.S. Application Data

(60) Provisional application No. 62/431,857, filed on Dec. 9, 2016.

(51) Int. Cl.

| | | |
|---|---|---|
| *D21H 27/00* | (2006.01) | |
| *B26D 1/56* | (2006.01) | |
| *B23D 47/04* | (2006.01) | |
| *B26D 7/01* | (2006.01) | |
| *B26D 3/16* | (2006.01) | |
| *B26D 1/16* | (2006.01) | |
| *D21H 27/30* | (2006.01) | |
| *B26D 7/12* | (2006.01) | |

(52) U.S. Cl.
CPC ............... *B26D 3/16* (2013.01); *B26D 3/161* (2013.01); *B26D 7/01* (2013.01); *B26D 7/015* (2013.01); *B26D 7/0683* (2013.01); *D21H 27/00* (2013.01); *D21H 27/002* (2013.01); *D21H 27/30* (2013.01); *B26D 7/12* (2013.01); *B26D 2007/013* (2013.01); *B26D 2210/11* (2013.01); *B65H 2701/19* (2013.01)

(58) Field of Classification Search
CPC ........ B26D 7/015; B26D 7/04; B26D 7/0683; B26D 7/12; B26D 2007/013; B26D 2210/11; B26D 2701/19; B26D 27/00; B26D 27/002; B26D 27/30
See application file for complete search history.

(56) References Cited

U.S. PATENT DOCUMENTS

| | | |
|---|---|---|
| 5,167,994 A | 12/1992 | Paulson |
| 5,357,833 A | 10/1994 | Biagiotti |
| 5,509,336 A | 4/1996 | Biagiotti |
| 7,617,852 B2 | 11/2009 | Perini |
| 8,037,794 B2 | 10/2011 | Ridolfi et al. |
| 11,065,776 B2 * | 7/2021 | Kettula .................... B26D 7/01 |
| 2004/0149103 A1 | 8/2004 | Rundell et al. |
| 2006/0162517 A1 | 7/2006 | Perini |
| 2006/0169357 A1 | 8/2006 | Perini |
| 2007/0207293 A1 | 9/2007 | Santiago |
| 2008/0017003 A1 | 1/2008 | Hsu |
| 2008/0216975 A1 | 9/2008 | Farwig et al. |
| 2012/0204691 A1 | 8/2012 | Gambini |
| 2013/0139664 A1 | 6/2013 | Diehr et al. |
| 2015/0298331 A1 | 10/2015 | Diehr et al. |
| 2017/0361484 A1 | 12/2017 | Pardini |
| 2018/0162004 A1 | 6/2018 | Kettula et al. |
| 2018/0162005 A1 | 6/2018 | Kettula et al. |
| 2018/0162006 A1 | 6/2018 | Kettula et al. |

OTHER PUBLICATIONS

All Office Actions; U.S. Appl. No. 15/834,775, filed Dec. 7, 2017.
All Office Actions; U.S. Appl. No. 15/834,807, filed Dec. 7, 2017.

* cited by examiner

FINISHED PRODUCTS FORMED FROM CUTTING CONVOLUTELY WOUND LOGS OF WEB MATERIALS

CROSS REFERENCE TO RELATED APPLICATIONS

This application is a continuation of, and claims priority under 35 U.S.C. § 120 to, U.S. patent application Ser. No. 15/834,735, filed on Dec. 7, 2017, which claims the benefit, under 35 USC § 119(e), of U.S. Provisional Patent Application Ser. No. 62/431,857, filed on Dec. 9, 2016, the entire disclosures of which are fully incorporated by reference herein.

FIELD OF THE INVENTION

The present disclosure generally relates to finished products formed from transversally cutting elongate logs of convolutely wound web materials. More particularly, the present disclosure relates to finished products formed from cutting elongate logs of convolutely wound web materials into shorter rolls of toilet paper, kitchen towels (all-purpose wipers) and the like having a uniform overall length.

BACKGROUND OF THE INVENTION

Several web material products are initially produced in "logs" for ease of manufacture. As used herein and in the appended claims, the term "web material" refers to any porous or non-porous product that can be found in sheet form, regardless of length or width. Although the preferred embodiments of the present invention described below are with reference to operations performed upon webs of material made of paper products (i.e., including without limitation—paper toweling, bath tissue, napkins, tissues, and the like). Other illustrative examples of web material products can include foil, film, fabric, cloth, cellophane, wrapping paper, wax paper, and the like.

As used herein, a "log", or "log of convolutely wound web material", or "log of web material" and other variations is a convolutely rolled product of any web material having any set of dimensions. Many types of paper are produced in logs for ease of manufacture. As used herein and in the appended claims, the term "convolutely wound log of web material" or "log" is meant to include rolls of paper products such as napkins, paper towels, facial tissue, toilet tissue, newsprint, and the like. However, the present disclosure is not limited to rolls of paper products. The term "convolutely wound log of web material" is also meant to include rolls of products made from other materials including without limitation cellophane, plastic sheeting, and other synthetic materials, fabric, woven, and non-woven textiles and cloth, foil, etc., regardless of product porosity, density, and dimensions. Generally, logs of convolutely wound web material are generally sawed into smaller rolls to be used by consumers. In many conventional log sawing devices, the sawing process generally involves a cutting blade, a clamp to hold the logs, and an advancing mechanism to move the logs. Typically, automated sawing processes have utilized a reciprocating or orbital radial or band saw in combination with a stationary log clamp or series of cooperative log clamps.

Logs of paper product are often not very strong radially and are typically clamped to provide support and to prevent the logs from being crushed by the saw. Such logs are preferably clamped on both sides of the blade to facilitate a straight cut through the logs. Most prior art clamps use elastic straps, flexible cylindrical strips, guide troughs, semi-cylindrical shells, or grippers to support a log during the sawing process. Exemplary log clamping mechanisms are disclosed in U.S. Pat. Nos. 5,509,336; 5,357,833; 5,647,259; 5,038,647; 5,315,907; and 3,049,954.

Each of these clamping assemblies can cause observable variations in the finished products. For example, prior art clamping devices can allow movement during the clamping process. Some prior art clamping devices apply uneven pressure around the circumference of the log that can cause the log to deform. Uneven pressure applied to the log deforms the log resulting in an uneven, or biased, cut. Highly compressible logs of web material experience a higher degree of deformation; less compressible logs of web material experience a lower degree of deformation. Highly compressible logs of web material deform during cutting. Thus, the log saw blade must exert more force on the log to reach the point in the deformation process where fracture occurs. The additional force exerted by the log saw blade causes local elastic deformation of the blade. These problems can all result in bias cutting or other product flaws.

FIG. 1 shows an idealized finished product 500 resulting from the processing of a convolutely wound log of web material L by a log saw. As shown, the idealized finished product 500 will have a target length, H, and a core 510 having a target length, h, that is set by the manufacturer according to a desired need. In other words, the manufacturer desires all finished products 500 to all have the target length, H, and the core 510 to have a target length, h, in order to facilitate any subsequent packaging equipment to operate in a more efficient manner, or minimize amount of material used to package the finished product 500, or even to provide a consumer accepted and more appealing finished product 500.

However, due to the use of current log saw clamping technologies currently available for use by manufactures of log saws, finished products are seldom produced in a manner that provides an idealized finished product. Typical finished products 500' may have a resulting end that is tapered due to a biased transverse cut of the convolutely wound log of web material L. By way of example only, the finished product 500' may have one portion with a target length, H and another portion of the finished product with a different length, H'. Further finished product 500' may have a core having a length h' that is different than the desired target length, h.

Additionally, it has been observed that current log saw clamping technologies currently available for use by manufactures of log saws can result in the wide variation of finished product 500 lengths H' and core lengths h' (different from the target lengths H, h) from multiple convolutely wound logs of web material L processed concurrently as well as the wide variations observed during the processing of the same convolutely wound log of web material L. This variation can be caused by a plurality of conditions that each alone can contribute to the observed variations in the finished products 500.

By way of example, the material(s) used to form convolutely wound log of web material L can result in convolutely wound log of web material L with a high degree of compressibility. When the log saw clamp endeavors to appropriately clamp a convolutely wound log of web material L having a high degree of compressibility, the convolutely wound log of web material L compresses (e.g., squishes) in the region proximate to the log saw clamps. Even though the log saw blade may be performing a transverse cut upon the convolutely wound log of web material L, when the convolutely wound log of web material L is released from the clamps, the material forming the convolutely wound log of web material L may have differing degrees of displacement.

By way of another example, economics requires the use of high-speed manufacturing processes. The ability of current log saw equipment and the associated log saw clamping assemblies, as well as current machine control strategies and architectures can introduce higher degrees of uncertainty of the placement of convolutely wound logs of web material L relative to the various components associated with the log saw. In other words, log saw have a significant number of moving parts and are attempting to perform a function on a material that is moving relative to the log saw itself. Due to all of the potential uncertainties in the process, providing a log saw clamp that reduces the degrees of freedom associated with the log saw is truly remarkable.

Further, as seen in FIG. 2, a collection 520 of finished products 500 typically bundled and packaged for sale to a customer can have a plurality of finished products 500, 500' disposed therein. On a store shelf, several collections 520 of finished products 500 (also called an aggregated collection or array) are placed proximate to one another to form an array. An array can be considered to comprise at least 2, or at least 3, or at least 4, or at least 5, or at least 10 collections 520 of finished products 500. It is desired to provide each finished product 500 with a length equal to the target length, H, and core 510 with a target length, h. In reality, what is typically seen is that each finished product 500, 500' will have a variety of actual, realized lengths, H' and a core 510 having actual, realized lengths, h'. For example, some of the cores 510, 510' of the collection of finished products 520 may protrude from the finished product 500, 500'. Conversely, some of the cores 510, 510' of the collection of finished products 520 may remain hidden within the inner confines of finished product 500, 500'.

Further, as shown in FIG. 3, some of the finished products 500, 500' may have convolutely wound product that has been cut at an angle, α, relative to the transverse of finished product 500, 500'. Clearly, it would be preferred that each finished product be provided with ends that are cut transverse to the longitudinal axis of the convolutely wound log of web material L or finished product 500. Any off-quality product having any of the artifacts discussed supra can result in a collection 520 of finished products 500 that does not have a planar outer surface. This can result in stacks of collections 520 of finished products 500 being unplumb and leaning. This lack of structural integrity can cause problems during the stacking process, during transport of pallets of stacks of collections 520 of finished products 500, as well as the end purchaser of a stack of collections 520 of finished products 500 having the stack of collections 520 of finished products 500 collapse. In any regard this outcome is not optimal.

A review of data for finished products 500, finished products 500 manufactured using current log saw clamp technology indicates that products with a target length of 11.08 inches can have an actual length ranging from 11.035 inches to 11.125 inches. This amounts to a relative error of 0.81% of the target length or a standard deviation, σ, of about 0.045. From a consumer (end user perspective) placing a finished product 500 into a standard wall-mounted paper towel roll holder, the extremes of this range can result in the finished product being too long or too short to be held in captive engagement with the wall-mounted paper towel roll holder. This is a clear negative that is observable by the end user and can result in rejection of the purchased final product 500.

Thus, there is a clear need to provide for finished products that have consistent physical characteristics. This means that each finished product produced by a process that converts convolutely wound logs of web materials into finished products using a unique log saw clamp assembly can product finished products that have a more consistent overall finished product length, a more consistent core length, and a more consistent finished product having transversely cut end that are more orthogonal to the longitudinal axis of the finished product. This need can solve these problems and provide clear benefits of providing a better consumer product, use less packaging and/or overwrapping materials, and reduce issues related to palletizing, transport, and storage of wrapped finished products.

DETAILED DESCRIPTION

Figure 1:
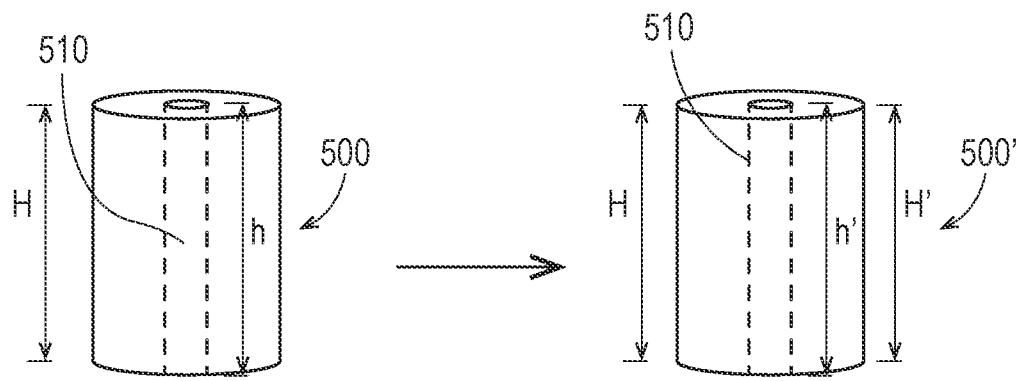
FIG. 1 is a plan view of an idealized finished product have an overall idealized height and an idealized core length (e.g., meets target lengths) and an off-quality finished product having an idealized height (e.g., meets target length) and a core length that is different from the desired target length (e.g., does not meet target length)
Figure 2:
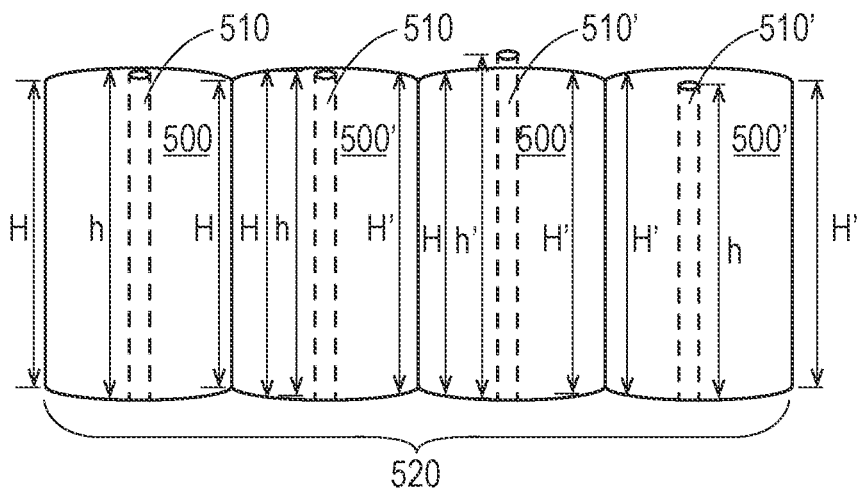
FIG. 2 is a plan view of an exemplary multi-count package containing a plurality of finished products each having height and core lengths that may meet target length or do not meet target lengths but each finished product resulting from a biased transverse cut by a typical prior art log saw having an exemplary prior art log saw clamping assembly.
Figure 3:
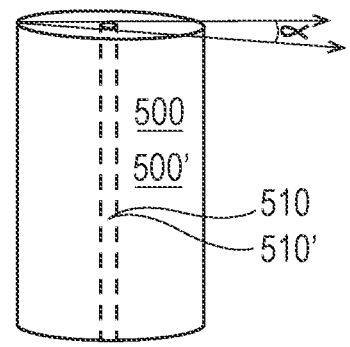
FIG. 3 is a plan view of a typical finished product resulting from a biased transverse cut by a typical prior art log saw having an exemplary prior art log saw clamping assembly

As used herein, the term "machine direction" (MD) refers to that direction which is parallel to the flow of the component materials used for the formation of absorbent articles through manufacturing equipment. The "cross-machine direction" (CD) is perpendicular to and co-planar with the machine direction. The "Z-direction" refers to that direction that is orthogonal to both the MD and CD.

Finished products having consistent physical characteristics are generally produced from convolutely wound logs of web material. Finished products can generally refer to sheets of paper characterized by having a network of fibers where the longitudinal axis of the constituent fibers forming the network of fibers are generally disposed in the plane comprising the machine and/or cross-machine directions. Finished products can be formed from web material that is generally a soft, low density material suitable for use as a wiping implement for post-urinary and post-bowel movement cleaning (e.g., bath tissue), for otorhinolaryngological discharges (e.g., facial tissue), and multi-functional absorbent and cleaning uses (e.g., absorbent paper towels).

Convolutely wound log of web material and the finished products produced therefrom may be convolutely wound about a core (or convolutely wound about itself without a core) to form dispensable rolls or packages of finished products to be used by consumers as absorbent sanitary paper products. Such dispensable rolls of absorbent sanitary paper product may be provided as a plurality of connected (or even unconnected), perforated (or separate) sheets of web material, that are separable dispensable from adjacent sheets.

The term 'network of fibers' can refer generally to a web material that can be made by any process suitable for the manufacture of absorbent sanitary paper products to be used by a consumer and disposed within or comprising a finished product. No limitation on the process for the manufacture of absorbent sanitary paper products or other similar consumer bath tissue and paper toweling products is made.

In one non-limiting example, a network of fibers used to manufacture a web material used to form a convolutely wound log of web material can be made by a process that generally comprises the steps of forming an aqueous papermaking furnish, depositing the aqueous papermaking furnish on a foraminous surface, such as a Fourdrinier wire, and removing the water from the furnish (e.g., by gravity or vacuum-assisted drainage), forming an embryonic web, and transferring the embryonic web from the forming surface to a transfer surface traveling at a lower speed than the forming surface. The web can then be transferred to a fabric upon which it is through air dried to a final dryness after which it is wound upon a reel.

The network of fibers of the present disclosure can comprise papermaking fibers of both hardwood and softwood types where at least about 50% of the papermaking fibers are hardwood and at least about 10% are softwood. The hardwood and softwood fibers can be isolated by relegating each to separate layers wherein the tissue comprises an inner layer and at least one outer layer. Another embodiment of the network of fibers can utilize multiple papermaking furnishes to provide the network of fibers with a content of at least about 80% hardwood.

Additionally, the network of fibers can include filaments and/or materials produced by known wet, solution, and dry filament spinning processes that are typically referred to as nonwoven processes. In one example, the filament spinning process is a meltblowing process where filaments are provided from a meltblow die (a filament source). Further processing of the fibrous structure may be carried out such that a finished fibrous structure is formed. For example, the finished fibrous structure is a fibrous structure that is wound on a reel at the end of a fibrous structure making process. The finished fibrous structure may subsequently be converted into a finished product, e.g. a sanitary tissue product.

A filament is an elongate particulate having a length greatly exceeding its average diameter, i.e. a length to average diameter ratio of at least about 10. In one example, the filament is a single filament rather than a yarn, which is a strand of filaments twisted together along their lengths. Filaments are typically considered continuous or substantially continuous in nature especially with respect to the fibrous structure in which they are present. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments. The filaments may be mono-component and/or multi-component.

The network of fibers can be provided as a single-ply comprising one ply of creped or un-creped web material. Any particular ply of creped or un-creped web material can be substantially homogeneous in nature or it can be multi-layered. The network of fibers can also be provided as a multi-ply web material that is comprised of more than one ply of creped or un-creped web material. In any regard, the plies of an exemplary network of fibers can be substantially homogeneous in nature or they can be multi-layered web materials.

The network of fibers can also be prepared from two or more layers of aqueous paper making furnish that are preferably comprised of different fiber types. In this case, the fibers can be provided as relatively long softwood and relatively short hardwood fibers. The layers can preferably be formed from the deposition of separate streams of dilute fiber slurries upon one or more endless foraminous surfaces. If the individual layers are initially formed on separate foraminous surfaces, the resulting layers can then be subsequently combined when wet to form a multi-layered network of fibers.

A Yankee dryer is a large diameter, generally 8-20 foot diameter drum pressurized with steam to provide a hot surface for completing the drying of paper webs at the end of a papermaking process. The network of fibers can be transferred in a semi-dry condition to the surface of the Yankee dryer for the through air drying (TAD) process to be completed.

The network of fibers can be creped. This means that the network of fibers can be produced on a papermaking machine culminating with a Yankee dryer to which a partially dried web material that will form the network of fibers is adhered and upon which it is dried and from which it is removed by the action of a flexible creping blade.

Creping mechanically compacts the network of fibers (or any web material) in the machine direction. The creping action can result in an increase in basis weight (mass per unit area) of the network of fibers as well as dramatic changes in many physical properties of the network of fibers, particularly when measured in the machine direction. Creping can be accomplished with a flexible blade disposed upon a Yankee dryer in an on-machine operation.

While the characteristics of creped web materials that form the network of fibers, particularly when the creping process is preceded by methods of pattern densification, are preferred for forming the network of fibers, un-creped web substrates are also satisfactory. One form of a network of fibers is an uncreped tissue paper.

An uncreped tissue paper generally refers to a web substrate that is non-compressively dried, most preferably by TAD. The resultant TAD web materials forming the network of fibers can be pattern densified so that zones of relatively high density are dispersed within a high bulk field. This can include pattern densified web materials where zones of relatively high density are continuous and the high bulk field is discrete. An exemplary un-creped tissue paper web can be formed by an embryonic web which is transferred from the foraminous forming carrier upon which it is laid, to a slower moving, high fiber support transfer fabric carrier. The web is then transferred to a drying fabric upon which it is dried to a final dryness. Such webs can offer some advantages in surface smoothness compared to creped paper webs.

Web materials suitable for forming the network of fibers are preferably generally comprised of papermaking fibers. Small amounts of chemical functional agents such as wet strength or dry strength binders, retention aids, surfactants, size, chemical softeners, and crepe facilitating compositions are frequently included but these are typically only used in minor amounts. The papermaking fibers most frequently used in tissue papers that form the network of fibers are virgin chemical wood pulps. Additionally, filler materials may also be incorporated into the tissue papers of the present invention. Softening agents such as quaternary ammonium compounds can be added to the papermaking slurry that forms the network of fibers.

Wood pulp in all its varieties can form webs suitable for the network of fibers. However, other cellulose fibrous pulps, such as cotton linters, bagasse, trichomes, rayon, starches, and the like can be used and none are disclaimed. Wood pulps useful herein include chemical pulps such as, sulfite and sulfate (sometimes called Kraft) pulps as well as mechanical pulps including for example, ground wood, ThermoMechanical Pulp (TMP) and Chemi-ThermoMechanical Pulp (CTMP). Pulps derived from both deciduous and coniferous trees can be used.

Hardwood pulps and softwood pulps, as well as combinations of the two, may be employed as suitable fibers for the network of fibers of the present disclosure. The term "hardwood pulps" as used herein refers to fibrous pulp derived from the woody substance of deciduous trees (angiosperms), whereas "softwood pulps" are fibrous pulps derived from the woody substance of coniferous trees (gymnosperms). Blends of hardwood Kraft pulps, especially eucalyptus, and northern softwood Kraft (NSK) pulps can be suitable for the network of fibers. Further, layered tissue webs can form the network of fibers. Hardwood pulps such as eucalyptus can be used for outer layer(s) and northern softwood Kraft pulps can be used for the inner layer(s). Fibers derived from recycled paper, which may contain any or all of the above categories of fibers, can be used to form the network of fibers.

Other materials can be added to an aqueous papermaking furnish or an embryonic web to impart desired characteristics to the network of fibers and/or the resulting absorbent sanitary paper products comprising the finished product.

If permanent wet strength is desired, the group of chemicals can include polyamide-epichlorohydrin, polyacrylamides, styrene-butadiene lattices, insolubilized polyvinyl alcohol, urea-formaldehyde, polyethyleneimine, chitosan polymers, and mixtures thereof can be added to the papermaking furnish or to the embryonic web that forms the web material. Polyamide-epichlorohydrin resins can be of particular utility.

If it is desired to provide a web material and/or absorbent sanitary paper products with limited strength when wet because of the need for disposal through toilets into septic or sewer systems, binder materials can be chosen from the group consisting of dialdehyde starch or other resins with aldehyde functionality such as Co-Bond 1000.RTM by National Starch and Chemical Company and Parez® 750.RTM by Cytec of Stamford, Conn.

If enhanced absorbency is needed, surfactants may be used to treat the web materials of the present disclosure. The level of surfactant, if used, can preferably range from about 0.01% to about 2.0% by weight, based on the dry fiber weight of the tissue paper. Surfactants can preferably have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as Crodesta® SL-40.RTM available from Croda, Inc. (New York, N.Y.), alkylglycoside ethers, and alkylpolyethoxylated esters such as Pegosperse® 200 ML available from Glyco Chemicals, Inc. (Greenwich, Conn.) and IGEPAL® RC-520.RTM available from Rhone Poulenc Corporation (Cranbury, N.J.).

In order to provide finished products with the desirable physical characteristics discussed supra, each finished product can be produced by equipment and processes that convert convolutely wound logs of web materials into finished products. Preferred equipment can use a log saw having a unique log saw clamp assembly can produce finished products having a more consistent overall finished product length, a more consistent core length, and a finished product having more consistent transverse end cuts that are more orthogonal to the longitudinal axis of the finished product. This need can solve these problems and provide clear benefits of providing a better consumer product, use less packaging and/or overwrapping materials, and reduce issues related to palletizing, transport, and storage of wrapped finished products.

Figure 4:
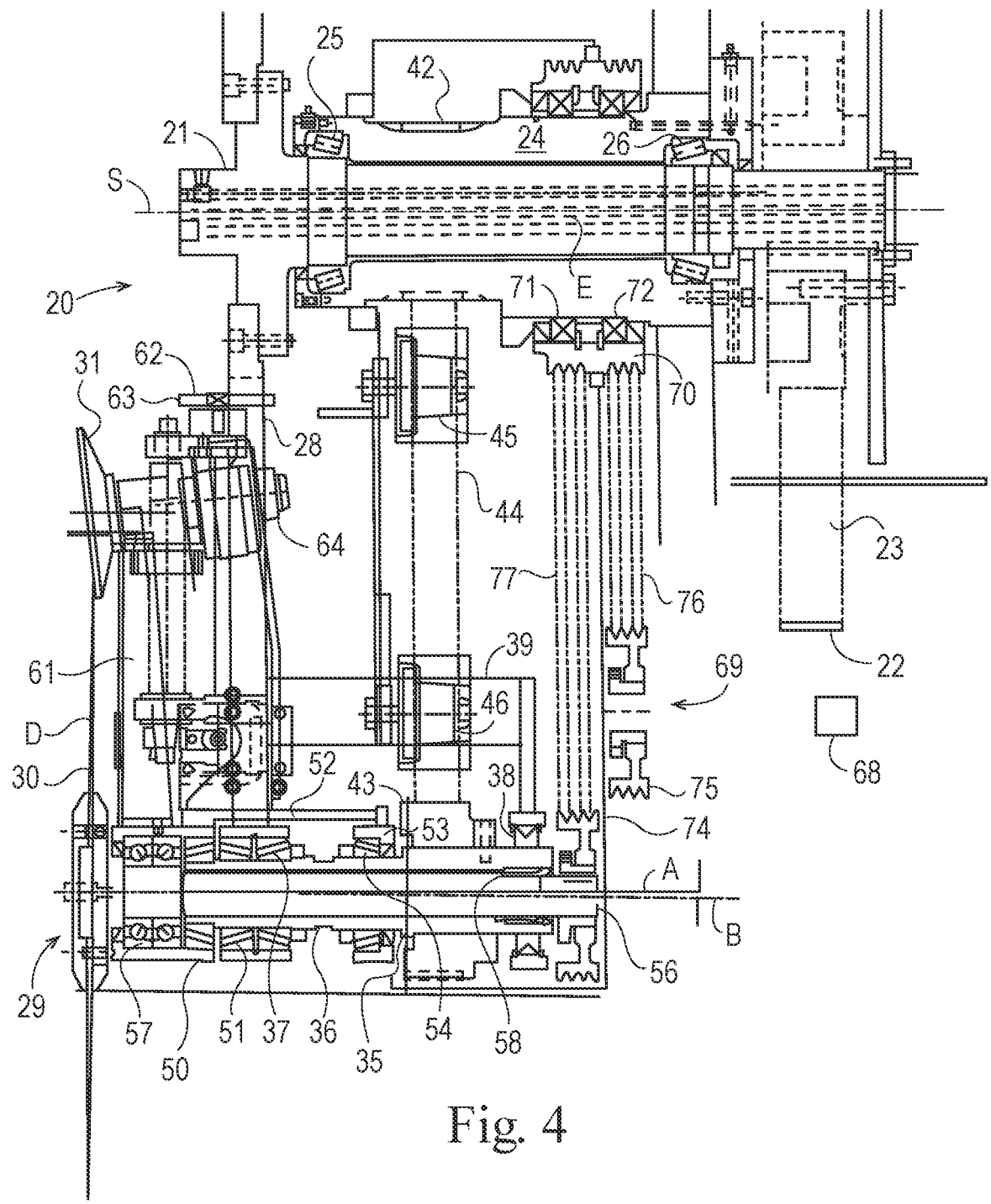
FIG. 4 is a fragmentary side elevational view of an exemplary continuous motion log saw.

FIG. 4 illustrates an exemplary log saw provided as a continuous motion saw 20 which includes a main drive shaft 21 which is rotatably mounted on a frame 22. The frame includes a skew plate 23 which supports a main bearing housing 24. Bearings 25 and 26 inside of the bearing housing rotatably support the main drive shaft 21 for rotation about an axis S which is skewed relative to the linear path P along which the product to be cut is advanced. The skew axis extends at a minor acute angle, $\Theta$, relative to the path P.

A skew arm 28 is attached to the left end of the main drive shaft 21 and supports an orbital head assembly 29. The orbital head assembly 29 includes a disc blade 30 and grinding stones 31. The invention will be explained with reference to a single disc blade and a single set of grinding stones. However, it will be understood that the log saw could include two or more blades and associated sets of grinding stones. Additionally, the log saw can incorporate any means to effectively transversely cut a log of convolutely wound web material including, but not limited to, water jets, saw blades (circular, linear, or chain), blade knives, water knives, air knives, lasers, and the like, and combinations thereof.

The orbital head assembly 29 includes an angular differentiator 35 which is rotatably mounted on the skew arm 28 for rotation about an axis, A, which is parallel to the skew axis, S. The angular differentiator includes a generally cylindrical housing 36 which is rotatably supported by bearings 37 and 38. Bearing 37 is mounted on the skew arm 28 and bearing 38 is mounted on bracket 39 which is attached to the skew arm. As the skew arm 28 is rotated by the main drive shaft 21, the angular differentiator 35 is caused to orbit in planetary motion by a sun pulley 42, a planet pulley 43, and a belt 44. The sun pulley 42 is formed as part of the stationary main bearing housing 24 and is concentric to the skew axis, S. The planet pulley 43 is mounted on the angular differentiator and is concentric to axis A. The pulleys 42 and 43 and the belt 44 can be provided with teeth to prevent slippage. Tension on the belt 44 can be adjusted by belt tighteners 45 and 46 which are mounted on the skew arm. The sun pulley 42, planet pulley 43, and belt 44 could be replaced by equivalent mechanisms, for example, sprockets and a chain.

A generally cylindrical grinder base 50 is rotatably mounted on the left end of the angular differentiator by a bearing 51. The grinder base is also supported by an arm 52 which is attached to the grinder base and to a bearing housing 53 which is rotatably mounted on the middle of the angular differentiator by a bearing 54. An elongated blade arbor or shaft 56 is rotatably supported inside of the grinder base by bearings 57 and inside of the angular differentiator by bearing 58. The axis of the blade arbor is aligned with the axis B. The disc blade 30 is mounted on the left end of the blade arbor and extends in a plane which is perpendicular to the path P.

Typically, grinding stones 31 are attached to the grinder base 50 by a support arm 61. The grinding stones are mounted radially inwardly of the blade and the grinder base, and a retaining guide 62 positions and holds the grinding stones radially inwardly throughout the orbit as it moves parallel to axis B within retainer arms 63. The retainer arms are attached to the skew arm 28. The grinding stones are driven by a conventional air motor 64 for sharpening the blade at the appropriate time during the cycle.

The disc blade 30 is driven by a blade drive motor 68 and an intermediate drive assembly 69. The intermediate drive assembly includes a pulley 70 which is rotatably mounted on the main bearing housing 24 by bearings 71 and 72. The pulley 70 is mounted on the main bearing housing so that the axis of rotation of the pulley is aligned with an axis E which is eccentric, i.e., offset and parallel, with respect to the skew axis S. The mount of eccentricity is dependent on the skew angle, $\Theta$, in conjunction with the position of the intersection of the axes A and B.

The intermediate drive assembly 69 also includes a pulley 74 which is mounted on the right end of the blade arbor 56. A pulley 75 is mounted on the drive shaft of the blade drive motor 68 and is connected to the pulley 70 by belt 76. The pulley 70 is connected to the pulley 74 on the blade arbor by belt 77.

Logs of paper product are often not very strong radially and should be clamped to provide support and to prevent the logs from being crushed by the saw. Logs are preferably clamped on both sides of the blade to facilitate a straight, orthogonal cut through the logs. A log clamping mechanism should provide for a strong design, is not speed limited, reduce wear and stress on parts, and rely upon a reduced parts inventory.

A satisfactory log saw that provides finished products having consistent physical characteristics should provide a log saw clamp that is easily adjustable, substantially rigid, strong, effectively clamps the log, does not require that logs be slowed during cutting operations, has relatively few moving parts, does not have an overly complex design with small intricate parts, has a design permitting ease of manufacture and maintenance, is easy to adjust without requiring system shutdown, and which has a minimum number of moving parts subject to wear.

Figure 5:
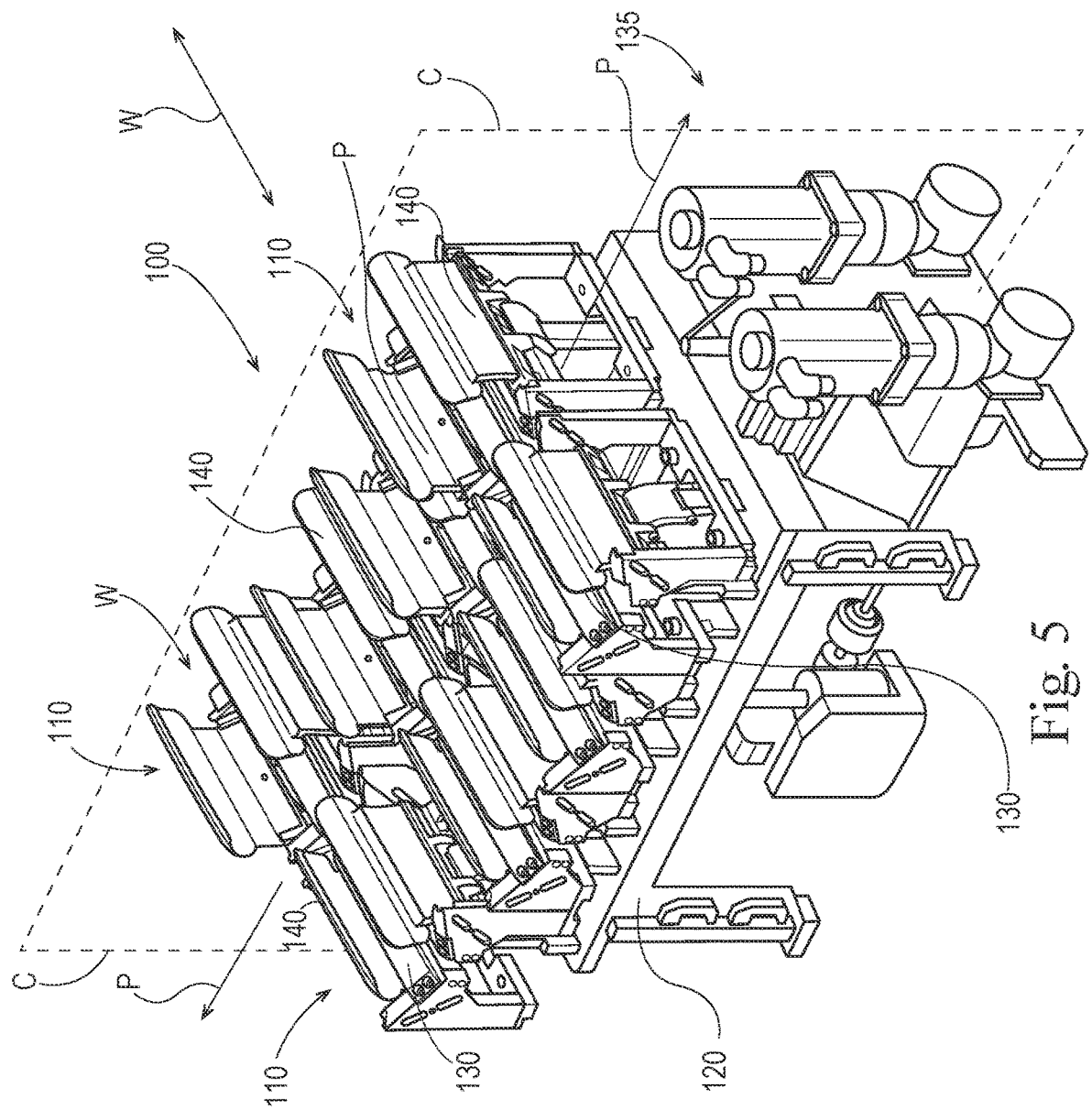
FIG. 5 is a perspective view of an exemplary log saw clamping assembly commensurate in scope with the present disclosure.
Figure 6:
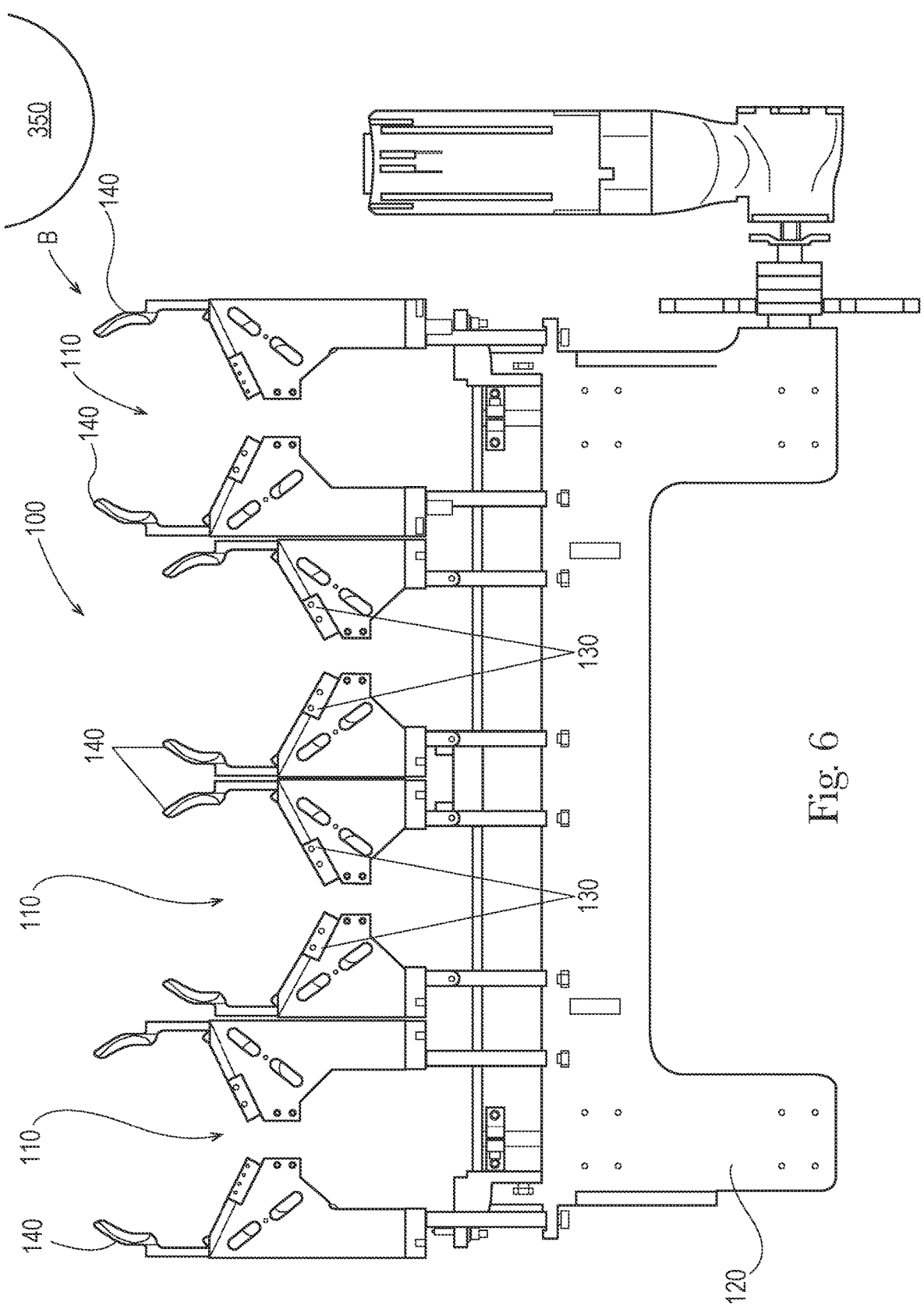
FIG. 6 is a cross-sectional view of a portion of the exemplary log saw clamping assembly of FIG. 5.
Figure 7A:
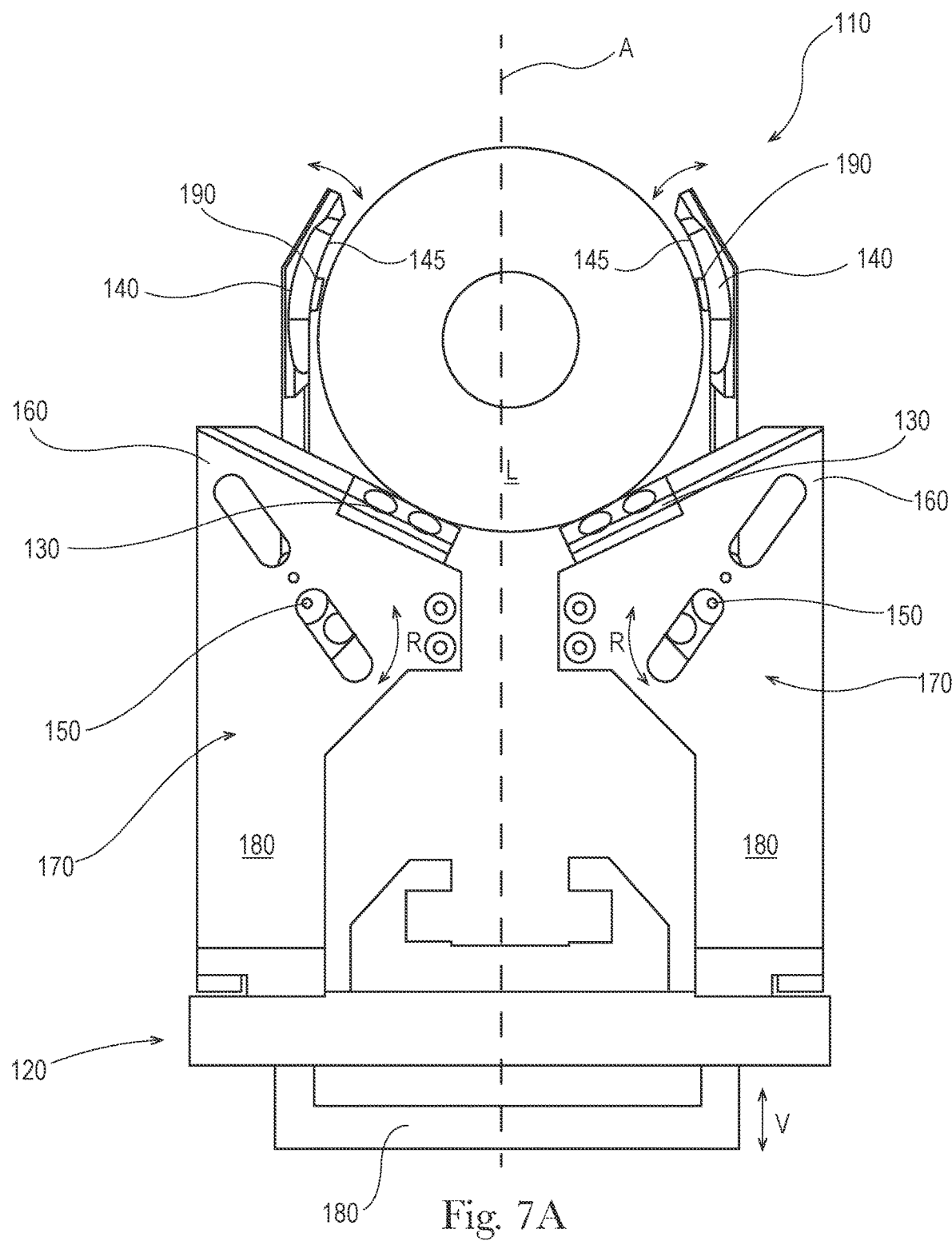
FIG. 7A is a cross-sectional view of an exemplary log saw clamp suitable for clamping a log of convolutely wound web material to be cut by a log saw showing the opposed paddles disposed away from contacting engagement with a log to facilitate movement of the log relative to the log saw clamp.
Figure 7B:
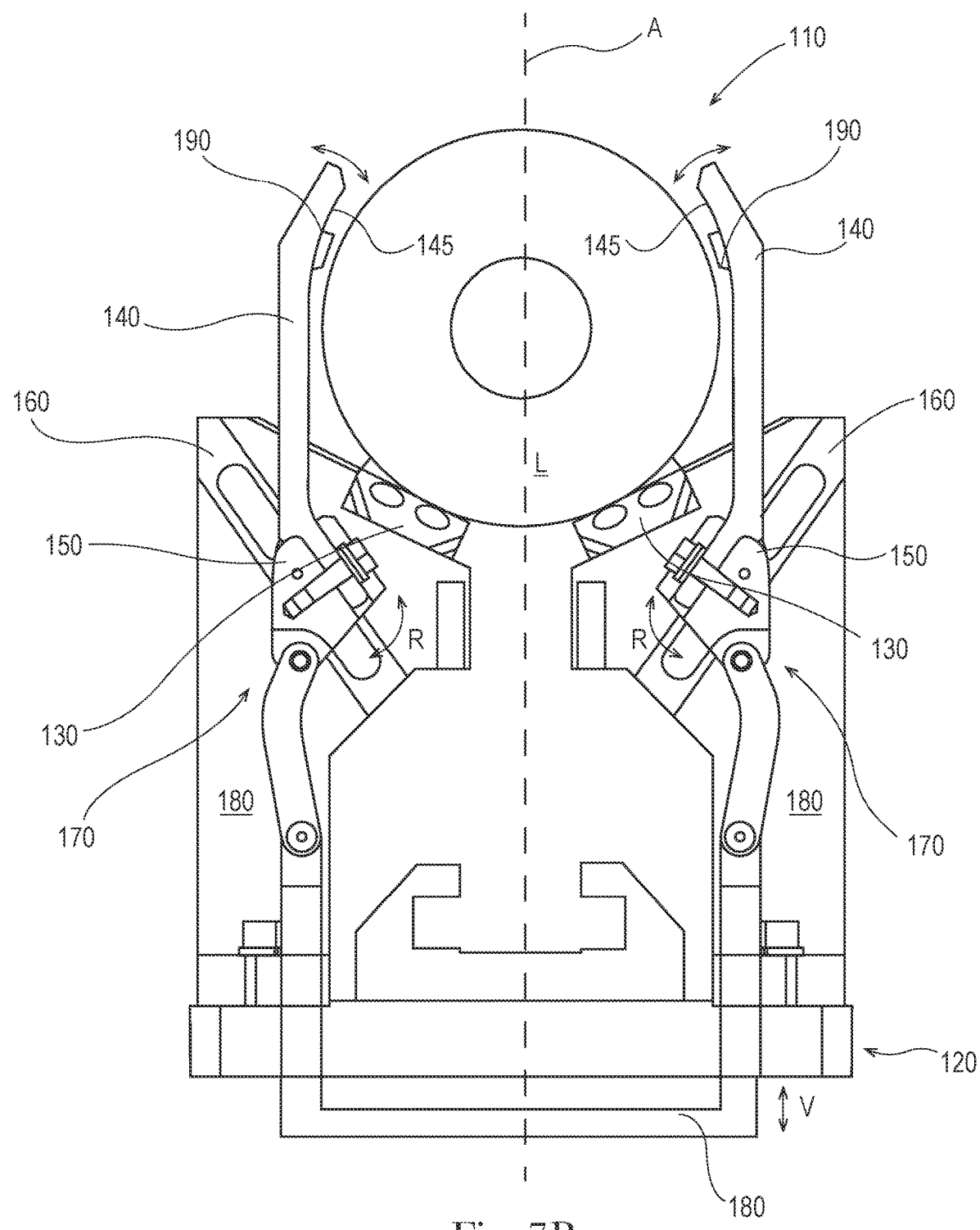
FIG. 7B is a cross-sectional view of the reverse side of the exemplary log saw clamp of FIG. 7A.
Figure 8A:
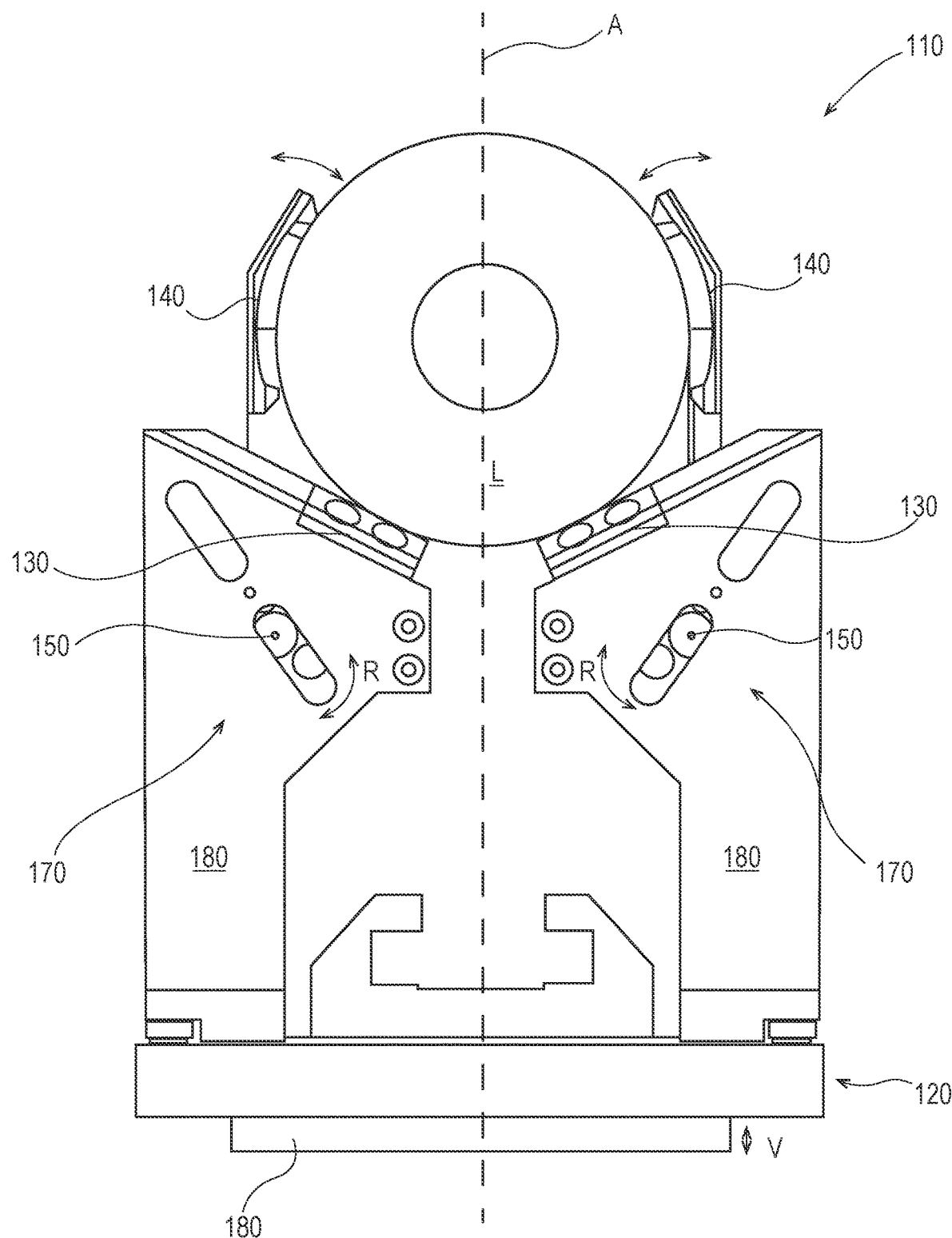
FIG. 8A is a cross-sectional view of an exemplary log saw clamp suitable for clamping a log of convolutely wound web material to be cut by a log saw showing the opposed paddles disposed in contacting engagement with a log to prevent movement of the log relative to the log saw clamp.
Figure 8B:
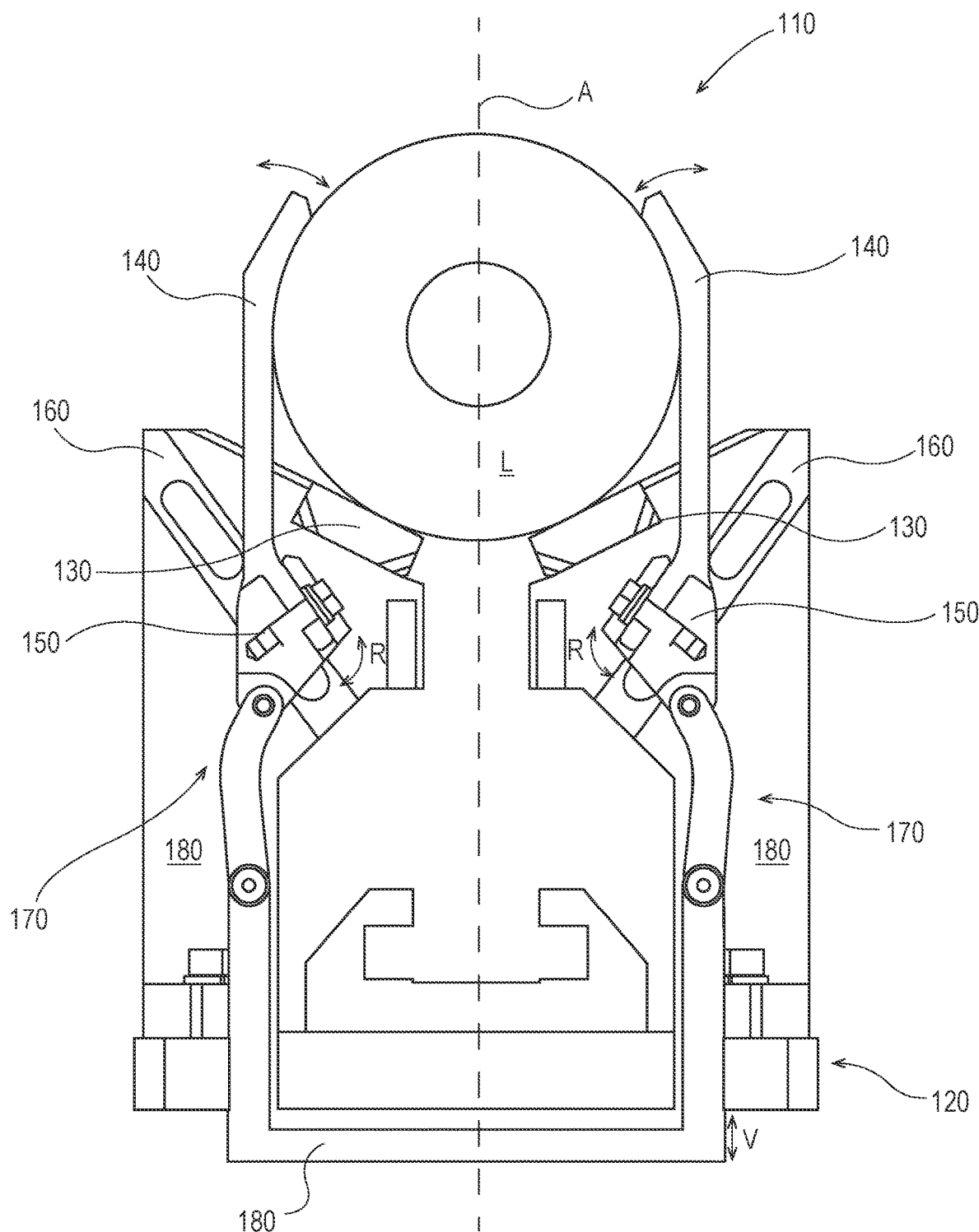
FIG. 8B is a cross-sectional view of the reverse side of the exemplary log saw clamp of FIG. 8A; and, FIG. 9 is a perspective view of an exemplary Roll Diameter Tester for determining Percent Roll Compressibility (Percent Compressibility).

As shown in FIGS. 5-6, a log saw suitable for providing finished products 500, collections 520 of finished products 500, and aggregated collections 520 of finished products 500 can be provided with an exemplary log saw clamping assembly 100 provided as a plurality of individual log saw clamps 110 where each individual log saw clamp is provided with a plurality of paddles 140 and is operably coupled to a support structure 120. A region disposed between collectively collinear log saw clamps 110 is provided as a cutting plane C-C and whose path is indicated by P.

On either side of path C are the log saw clamps 110 which are capable of acting on a cylindrical material such as a convolutely wound log of web material (not shown) that is advanced in the direction of the arrow W under the action of a motivator (not shown). The motivator (not shown) can be provided by one of skill in the art in the form of pushers or pushing extensions, chain conveyers, or belt conveyors. By way of non-limiting example, a motivator provided in the form of a chain conveyor can be provided as a continuous chain that is capable of acting on the ends of a convolutely wound log of web material (i.e., logs).

In the cutting plane C-C and along the path P, a circular blade of the log saw rotating about its own axis and movable about another axis (which may be nearer or farther away) causes the wound log of web material to be cut into a number of small rolls which are then sent for packaging for distribution. Adjacent to either side of the cutting plane C-C and path, P, the wound log of web material being processed must be retained by log saw clamps 110 each of which bind the wound log of web material and keep the convolutely wound log of web material compressed and positioned with respect to the pushers to ensure the precision of the spacing between sequential cuts of each the wound log of web material, in such a way as to ensure uniformity of the cuts performed on the wound log of web material. Also, it is preferred that each log saw clamp 110 be capable of easy adaption to different diameters of convolutely wound log of web material that are processed from time to time.

Each advancing convolutely wound log of web material is preferably guided in suitable sliding cradles 130, must therefore pass through the elements forming each log saw clamp 110 both before reaching the cutting plane C-C and after the cutting plane C-C with respect to the movement of each convolutely wound log of web material relative to support structure 120 in the direction of arrow W. A log saw may be provided with at least two sliding cradles 130 to process simultaneously, and with the same cutting blade, at least two rows of convolutely wound logs of web material advancing in each corresponding sliding cradle 130 with the aid of a corresponding pusher. In a solution of this kind, four log saw clamps 110 can be provided, each pair of log saw clamps 110 acting on a respective convolutely wound log of web material where one log saw clamp 110 being disposed before cutting plane C-C and one log saw clamp 110 being disposed after cutting plane C-C with the cutting path P disposed therebetween where each log of convolutely wound paper product moves in direction W. In any regard, at least one individual log saw clamp 110 is used to clamp logs of convolutely wound web material L to provide support and to prevent the logs from being crushed by the log saw blade. In any regard, each log of convolutely wound web material L is preferably clamped on both sides of the blade to facilitate a straight cut through each log of convolutely wound web material L. Further, it is preferred that each paddle 14 of log saw clamp 110 provide the same force upon the surface of convolutely wound log of web material L. Without desiring to be bound by theory, it is believed that by each paddle 14 of log saw clamp 110 providing the same force upon the surface of convolutely wound log of web material L can prevent the unwanted deformation of convolutely wound log of web material L that can result in bias cutting or product flaws.

A controller 135 can provide control of the positional placement of first log saw clamp 110 of log saw clamping assembly 100 to contactingly engage a first portion of a convolutely wound log of web material L disposed within its respective sliding cradle 130, second log saw clamp 110 of log saw clamping assembly 100 to contactingly engage a second portion of the convolutely wound log of web material L disposed within its respective sliding cradle 130, and log saw blade 350 can be disposed intermediate the respective first and second log saw clamps 110. The controller 135 can include any suitable structure for controlling the operation of at least part of the log saw clamps 110 of log saw clamping assembly 100, such as a computing device.

A network can be coupled to the controller 135 and various components of the log saw clamping assembly 100 (such as actuators). The network can facilitate communication between components of the log saw clamping assembly 100. The network can represent any suitable network or combination of networks facilitating communication between components in the system. The network could, for example, represent a wired or wireless Ethernet network, an electrical signal network (such as a HART or FOUNDATION FIELDBUS network), a pneumatic control signal network, or any other or additional network(s).

As shown in FIGS. 7A-8B, a log saw clamp 110 suitable for providing finished products 500, collections 520 of finished products 500, and aggregated collections 520 of finished products 500 can be provided with an exemplary log saw clamping assembly 100 and suitable for clamping a convolutely wound log of web material L prior to a saw cut is formed from a plurality of opposed paddles 140. Each paddle 140 can be provided as a rigid, substantially semicircular hook made of a composite material that provides a rigid structure while also reducing friction as the convolutely wound log of web material L moves within log saw clamp 110. One of skill in the art will appreciate that the desired curvature of the inside of a paddle 140 can be derived from modeling the various products to be processed on a converting line. The radius and curvature of the paddle 140 can be provided in a manner that facilitates and/or provides the cooperative contact of a respective paddle 140 with the surface of a convolutely wound log of web material L having virtually any cross-sectional diameter (e.g., for example, paper towel products are typically provided with a cross-sectional diameter ranging from 2.0 inches to 12.0 inches). In the event a product diameter outside this typical range is required and/or desired, the inter-connection between each respective paddle 140 and any linkages can be simplified (e.g., for example a single bolt attachment) to provide for the quick change-out of the paddle 140 for a paddle 140 having an alternative design suitable for the product required.

It was found that the vast majority of standard diameters of convolutely wound log of web materials L can utilize a single, standard paddle 170 design. However, if a non-standard convolutely wound log of web material L diameter is processed, the ability to quickly change over one paddle 170 design to another paddle 170 design would be clearly desirable and accomplishable by way of the design of the log saw clamp 110 of the present disclosure.

Each paddle 140 is operatively connected by a linkage, or a series of interconnected linkages, 170 to support structure 120. Disposed upon each linkage 170 operatively and connectively associated with a respective paddle 140 is at least one cam follower 150. Each cam follower 150, or plurality of cam followers 150, operatively and connectively associated with a respective paddle 140 is operably, connectively, and moveably disposed within a respective cam 160. As used herein, it should be understood by one of skill in the art that a "cam" is to be broadly construed to provide a path or line for travel or motion for sliding or rolling a part or parts. As such, a "cam" may include any device, apparatus, or assembly that prevents the unwanted movement from one portion of a device or assembly to another. Non-limiting examples of various tracks may include a race, a cam, a trace, a channel, groove, a rail, or the like all of which are used interchangeably, and combinably, herein without limitation.

As indicated, each cam follower 150, or plurality of cam followers 150, operatively and connectively associated with a respective paddle 140 can be slidingly fitted within a respective cam 160. Each respective cam 160 can be machined or formed in a supporting surface 180. Each respective cam 160 can be inclined at a desired, predetermined angle relative to vertical axis A to provide the requisite operable, connective, and moveable disposition of any cam followers 150 disposed within the respective cam 160. It should be noted that vertical axis A can also be referred to herein as axis of symmetry A because axis of symmetry A (i.e., vertical axis A) divides log saw clamp 110 into two congruent halves.

In one embodiment, each linkage 170 operably connected to paddles 140 forming a pair of opposing paddles 140 for clamping a convolutely wound log of web material L prior to a saw cut is connected to a common mechanism that facilitates rectilinear motion of each linkage 170 and the associated paddle 140. The common mechanism can then be translated from a first position where each linkage 170 operably connected to a respective paddle 140 causes the respective paddle 140 to refrain from contacting engagement with the convolutely wound log of web material L disposed between opposing paddles 140 to a second position where each linkage 170 operably connected to a respective paddle 140 causes the respective paddle 140 to contactingly engage the surface of convolutely wound log of web material L disposed between opposing paddles 140. Naturally, one of skill in the art will understand that the first and second positions can be used interchangeably. For example, one of skill in the art will understand that the first position can provide opposing paddles 140 in contacting engagement with the surface of convolutely wound log of web material L disposed therebetween and the second position can provide opposing paddles 140 refraining from contacting engagement (i.e., in non-contacting engagement) with the surface of convolutely wound log of web material L disposed therebetween.

As shown in FIGS. 7A-8B, the application of force by an actuator to a respective linkage 170 causes linkage 170 to apply a force to the cam follower 150 cooperatively engaged thereto. Alternatively, the force by an actuator can be applied to a bracket 180 that is operatively and connectively engaged to at least a pair of respective linkages 170. In this manner, the application of force to a bracket 180 that is connectively engaged to a pair of linkages (or any number of linkages) can provide for the substantially similar rectilinear motion in the direction V relative to axis A of each linkage 170 engaged thereto.

As the force exerted by a respective linkage 170 to the cam follower 150 cooperatively engaged thereto increases, cam follower 150 is caused to translate within cam 160 disposed thereabout. It can be preferred that the facilitation of a so-called "quick change-over" of paddles 140 can be facilitated by providing limited connection points (e.g., a single connection point) between the portion of the linkage 170 engaged proximate to cam 160 and the respective paddle 140. For example if a converting process experiences difficulty processing a highly compressible product, an end user of log saw clamp 110 can easily and quickly install a specific paddle 170 design that is capable of supporting the particular product.

By way of non-limiting example, a linkage 170 provided as a two bar linkage is operably connected to a right-handed paddle 140 and a linkage 170 provided as a two bar linkage is operably connected to a left-handed paddle 140. The cam follower 150 of each of the right-handed paddle 140 and associated linkage 170 and the left-handed paddle 140 and associated linkage 170 are constrained to ride in a respective cam 160 that is provided with sufficient length to provide for any diameter of convolutely wound log of web material L desired. It was surprisingly found that the use of cam 160/cam follower 150 systems significantly reduced, or even eliminated drag or binding as the linkage 170 moves up or down relative to the convolutely wound log of web material L disposed within sliding cradle 130 of log saw clamp 110.

The log saw clamp 110 of the present disclosure leverages a fixed platform that is level with any in-feed and discharge sliding conveyors 130. This aspect of the log saw clamp 110 can readily accommodate any changes in diameter of the convolutely wound logs of web material L to be processed. In short, this can be accomplished by using a 2-bar linkage 170 that is trapped in a slot (i.e., cam 160/cam follower 150 system described herein). As a force is applied to the linkage 170, the distance between opposed paddles 140 increases or decreases because of the angle provided to cam 160 relative to the vertical axis A. The relative distance between opposed paddles 140 can be facilitated due to the angle relative to the vertical axis A of the cam 160 and the application of force to linkage 170 toward or away from convolutely wound log of web material L.

As cam follower 150 translates within cam 160, the paddle 140 cooperatively associated thereto is caused to only rotate in the direction R about a central axis located proximate to the centroid of the of cam follower 150. It is believed that limiting this paddle 140 to purely rotational movement relative to linkage 170 can eliminate any elevation change occurring when the distance between opposed paddles 140 expands or contracts resulting in a more accurate cut.

As the paddle 140 rotates in the direction R about the central axis of cam follower 150, the paddle can be directed into contacting engagement, or alternatively disengaged from contacting engagement, with the surface of convolutely wound log of web material L as indicated by the arrows disposed at the distal end of each paddle 140.

In one embodiment, each of cam 150 and cam follower 160 are disposed in a mirror-like relationship relative to the vertical axis A and the convolutely wound log of web material L to be acted upon by the log saw cooperatively associated with log saw clamping assembly 100. Additionally, one of skill in the art will recognize that cam follower 160 could be provided as a plurality of small rollers suitable to provide essentially sliding movement within cam 150.

One of skill in the art would be able to provide the cam follower 160 with an inclination angle of 30° to 65° relative to the vertical axis A in order to combine, in a way which is deemed to be optimal, the vertical and horizontal components of the displacement of each paddle 140, and to allow the log saw clamping assembly 100 to work as best as possible whatever the diameter of convolutely wound log of web material L. Thus, it is believed that the log saw clamping assembly 100 can be extremely versatile by having the capability to handle a convolutely wound log of web material L having virtually any diameter.

When the pair of opposed paddles 140 are not in contacting engagement with the convolutely wound log of web material L, the convolutely wound log of web material L may translate forwards in the direction W while engaged within sliding cradle 130. Sliding cradle 130 is capable of translating the convolutely wound log of web material L from a position external to the log saw clamping assembly 100 to a second position relative to, and intermediate, the pair of opposed first and second paddles 140. Sliding cradle 130 is also capable of translating the convolutely wound log of web material L from a position relative to, and intermediate, the pair of opposed first and second paddles 140 to a position external to the log saw clamping assembly 100 after the log saw has processed the convolutely wound log of web material L.

When the forwardly translating convolutely wound log of web material L is in a desired position for the log saw to transversely cut convolutely wound log of web material L, the paddles 140 are positioned in contacting and compressive engagement with the surface of convolutely wound log of web material L as described supra. At this position, the convolutely wound log of web material L is unable to move relative to the log saw clamping assembly 100.

Each paddle 140, being approximately semicircular and in mirror-like relationship, embrace the convolutely wound log of web material L laterally and on top as well, thereby retaining the convolutely wound log of web material L in a preset position. At the bottom, each convolutely wound log of web material L rests upon sliding cradle 130. The log saw can then be energized and transversely cut the convolutely wound log of web material L as described supra.

Paddle 140 can be provided with a surface that has a texture that can reduce the slippage of a convolutely wound log of web material L disposed between opposed paddles 140. By way of non-limiting example paddle 140 can be provided with a surface having a finish texture that comprises a plurality of protuberances arranged in any manner desired upon the surface of a paddle 140. For example, each protuberance can be provided as a pin, a polyhedron having a shape that is a pyramid, a cylinder, a cone, a truncated cone, a sphere, a prism, an ellipsoid, a series of linear sections, and/or combinations thereof extending from the surface of paddle 140.

A log saw clamp 110 suitable for providing finished products 500, collections 520 of finished products 500, and aggregated collections 520 of finished products 500 with can be provided with the ability to provide a different contact pressure via the respective paddles 140 to the surface of convolutely wound logs of web material L. The pressure disposed by a respective paddle 140 can be determined by the placement of a measurement device 190 upon the surface 145 of paddle 140. Measurement device 190 could be provided as a pressure sensor such as a load cell. Measurement device 190 can be operatively connected to a control system or other feedback system used by those of skill in the art to determine the pressure exerted by paddle 140 upon the surface of a convolutely wound log of web material L. For example, a pressure set-point can be input into a control system, the pressure exerted by paddle 140 upon the surface of a convolutely wound log of web material L can be measured, and the pressure exerted by paddle 140 upon the surface of a convolutely wound log of web material L can be adjusted as required according to a feed-back loop. Thus, if a paddle 140 or pair of opposed paddles 140 is applying excessive pressure upon the surface of a convolutely wound log of web material L causing the convolutely wound log of web material L to deform, the measurement device 190 can measure the pressure, the measured pressure is then compared to a known or desired set-point, an error is calculated based upon the measured and set-point values, the error is then used to adjust the actual pressure applied to the convolutely wound log of web material L by a respective paddle 140 or pair of opposed paddles 140. Knowing the actual pressure applied by a respective paddle 140 or pair of opposed paddles 140 to the surface of a convolutely wound log of web material L disposed therebetween can effectively increase the reliability of the log saw process in providing a more consistent transverse cut upon a convolutely wound log of web material L. This can provide each finished product resulting from the cuts performed upon a convolutely wound log of web material L by a log saw with a more consistent and/or uniform overall length.

Thus, it is believed that the log saw clamp 110 of the present disclosure can reduce the overall length variability observed in finished products 500, and collections 520 of finished products 500, and aggregated collections 520 of finished products 500 produced by equipment incorporating the prior art log saw clamps discussed supra. Here, aggregates of collections 520 of finished products 500 means at least two individual collections 520 of finished products 500 disposed in at least proximate engagement and preferably in contacting engagement), such as would be observed in stacks of collections 520 of finished products 500 upon the surface of a pallet or collections 520 of finished products 500 disposed in a side-by-side relationship as would be observed on a store shelf.

Test Methods
1. Sample Conditioning and Preparation

Unless otherwise indicated, samples are conditioned according to Tappi Method #T402OM-88. Paper samples are conditioned for at least 2 hours at a relative humidity of 48 to 52% and within a temperature range of 22° to 24° C. Sample preparation and all aspects of testing using the following methods are confined to a constant temperature and humidity room.
2. Basis Weight Test Method Basis weight of a fibrous structure and/or sanitary tissue product is measured on stacks of twelve usable units using a top loading analytical balance with a resolution of ±0.001 g. The balance is protected from air drafts and other disturbances using a draft shield. A precision 4 in square shaped cutting die, with a cut area of 16.00 in$^2$ (area accurate to +/−0.2%), is used to prepare all samples.

Stack eight usable units aligning any perforations or folds on the same side of stack. With a precision cutting die, cut the stack into squares. Measure the mass of the sample stack and record the result to the nearest 0.001 g. The Basis Weight is calculated in lbs/3000 ft$^2$ or g/m$^2$ as follows:

Basis Weight=(Mass of stack)/[(Area of 1 layer in stack)×(Number of layers)]

For example,

Basis Weight(lbs/3000 ft$^2$)=[[Mass of stack(g)/453.6 (g/lbs)]/[16(in$^2$)/144(in$^2$/ft$^2$)×8]]×3000 or,

Basis Weight(g/m$^2$)=Mass of stack(g)/[103.23(cm$^2$)/ 10,000(cm$^2$/m$^2$)×8]

Report result to the nearest 0.1 lbs/3000 ft$^2$ or 0.1 g/m$^2$. Sample dimensions can be changed or varied using a similar precision cutter as mentioned above, so as at least 100 square inches of sample area in stack.

A web material used to form a finished product 500 can be a consumer preferred substrate such as Charmin® bath tissue or Bounty® paper towels manufactured and sold by the Procter & Gamble Company, Cincinnati, Ohio. A web material that forms finished products 500 of the present disclosure can have a basis weight of less than 95 g/m$^2$ and/or less than 75 g/m$^2$ and/or ranging from between about 5 g/m$^2$ and about 95 g/m$^2$ and/or between about 10 g/m$^2$ and about 95 g/m$^2$ and/or between about 10 g/m$^2$ and about 100 g/m$^2$ and/or between about 10 g/m$^2$ and about 75 g/m$^2$.
3. Compressibility Thickness (measured in mils, 0.001 inch) is measured as a function of confining pressure (g/in$^2$) using a Thwing-Albert (14 W. Collings Ave., West Berlin, N.J.) Vantage Compression/Softness Tester (model 1750-2005 or similar), equipped with a 2500 g load cell (force accuracy is +/−0.25% when measuring value is between 10%-100% of load cell capacity, and 0.025% when measuring value is less than 10% of load cell capacity), a 1.128 inch diameter steel pressure foot (one square inch cross sectional area) which is aligned parallel to the steel anvil (2.5 inch diameter). The pressure foot and anvil surfaces must be clean and dust free, particularly when performing the steel-to-steel test. Thwing-Albert software (MAP) controls the motion and data acquisition of the instrument.

The instrument and software is set-up to acquire crosshead position and force data at a rate of 50 points/sec. The crosshead speed (which moves the pressure foot) for testing samples is set to 0.10 inches/min (the steel-to-steel test speed is set to 0.05 inches/min). Crosshead position and force data are recorded between the load cell range of approximately 5 and 1525 grams during compression of this test. Since the foot area is one square inch, the force data recorded corresponds to pressure in units of g/in$^2$. The MAP software is programmed to report 12 crosshead position values at specific pressure trap points (PTP) of 100, 125, 150, 200, 300, 400, 500, 600, 750, 1000, 1250, and 1500 g/in$^2$ (i.e., recording the crosshead position of very next acquired data point after the each pressure point trap is surpassed).

Since the overall test system, including the load cell, is not perfectly rigid, a steel-to-steel test is performed (i.e., nothing in between the pressure foot and anvil) at least twice for each batch of testing, to obtain an average set of steel-to-steel crosshead positions at each of the 12 trap points. This steel-to-steel crosshead position data is subtracted from the corresponding crosshead position data at each trap point for each tested sheet sample, thereby resulting in the sheet thickness (mils) at each pressure trap point.

$$SheetT(\text{trap}) = SheetCP(\text{trap}) - SteelCP(\text{trap})$$

-continued where:

trap = trap point pressure

SheetT = Thickness of sheet (at trap pressure)

SheetCP = Crosshead position of sheet in test (at trap pressure)

SteelCP = Crosshead position of steel-to-steel test (at trap pressure)

The test sample is cut to a size no larger than about 4 inch by 4 inch, and no smaller than the area of the pressure foot (about 1.25 inch by 1.25 inch). The area to be tested for compressibility (i.e., that which is to be contacted by the pressure foot) must be free of flocked material (so that only the base material is tested). While handling the sample, the test region of the sample (where the pressure foot contacts) must never be physically touched, stretched, or strained.

The sample is laid flat on the lower anvil, positioned such that the pressure foot does not contact any flocked material (if present on the sheet), and then the test is initiated (via the MAP software). From the test, the crosshead position of the sheet at each trap pressure is determined. This testing is repeated on a minimum of 3 replicate sheet samples per condition, in order to calculate an average crosshead position of the sheet at each trap pressure (i.e., SheetCP(trap)). Then, using the average steel-to-steel crosshead trap points (i.e., SteelCP(trap)), the average sheet thickness at each trap (i.e., SheetT(trap)) is calculated, and reported to the nearest 0.01 mils.

4. Density

The density (D) of a multi-layered tissue paper, as that term is used herein, is the average density calculated as the basis weight of that paper divided by the average sheet thickness at each pressure point trap (PTP) determined from the Compressibility test method described supra, with the appropriate unit conversions incorporated therein. Results are reported in g/cm$^3$.

A web material that forms finished products 500 of the present disclosure can have a density (measured at a 100 g/in$^2$ pressure trap point) of less than about 0.30 g/cm$^3$ and/or less than about 0.25 g/cm$^3$ and/or ranging from about 0.25 g/cm$^3$ to about 0.01 g/cm$^3$ and/or ranging from about 0.20 g/cm$^3$ to about 0.03 g/cm$^3$ and/or ranging from about 0.17 g/cm$^3$ to about 0.04 g/cm$^3$ and/or ranging from about 0.12 g/cm$^3$ to about 0.05 g/cm$^3$.

5. Dry Tensile

Tensile strength was measured according to Tappi method T 494 om-06, with exceptions and/or clarifications as follows: strip width=1.00 inches; gauge length=2.0 inches; rate of jaw separation=1.0 inch/min. 4 strips are tested in the MD, and 4 strips tested in the CD. The average tensile strength for each direction is calculated, and the sum of these two values is reported as the "Total Dry Tensile Strength" of the sample, reported in units of grams force per inch sample width (gf/in), to the nearest 1 gf/in.

A web material that forms finished products 500 of the present disclosure can have a total dry tensile strength of less than 8000 g/in and/or less than 5000 g/in and/or less than 3000 g/in and/or less than 2000 g/in and/or less than 1000 g/in and/or less than 800 g/in and/or less than 400 g/in and/or less than 200 g/in and/or less than 100 g/in.

6. Length

Length is determined by the use of a ruler, gauge block, or vision system having an accuracy of ±0.002 inches (±0.0508 mm).

A review of target data for finished products 500 manufactured using prior art log saw clamp 110 technology discussed supra provided finished products 500 with a target length H of 11.00 inches can have an actual length H' ranging from about 10.955 inches to about 11.045 inches. This provides a relative error of about 0.81% or a standard deviation, σ, of about 0.045.

From a consumer (end user perspective) placing a finished product 500 into a standard wall-mounted paper towel roll holder, the extremes of this range can result in the finished product being too long or too short to be held in captive engagement with the wall-mounted paper towel roll holder or ends of rolls that are observably not orthogonal to the axis of rotation of the finished product 500. This is a clear negative that is observable by the end user and can result in rejection of the purchase of any future final product 500.

Thus, it would be beneficial to provide each finished product 500 of paper towel product having a length, H', with a relative error of less than 2.00%, or less than 1.50%, or less than 1.00%, or less than 0.81%, or less than 0.75%, or less than 0.60%, or less than 0.50%, or less than 0.30% of the target length, H, whether considered individually, in a collection 520, or in an array. It would also be beneficial to provide the core 510 having a length, h', of each finished product 500 upon which the desired web material is disposed convolutely thereabout with a core length relative error of less than 2.00%, or less than 1.50%, or less than 1.00%, or less than 0.81%, or less than 0.75%, or less than 0.60%, or less than 0.50%, or less than 0.30% of the target length, h, whether considered individually, in a collection 520 of finished products 500, or in an array of finished products 500. In a preferred embodiment, each finished product 500, collections 520 of finished products 500, and aggregated collections 520 of finished products 500 has length H' and a core with a length h' that are equal to the target lengths H, h.

7. Percent Compressibility Test Method

Figure 9:
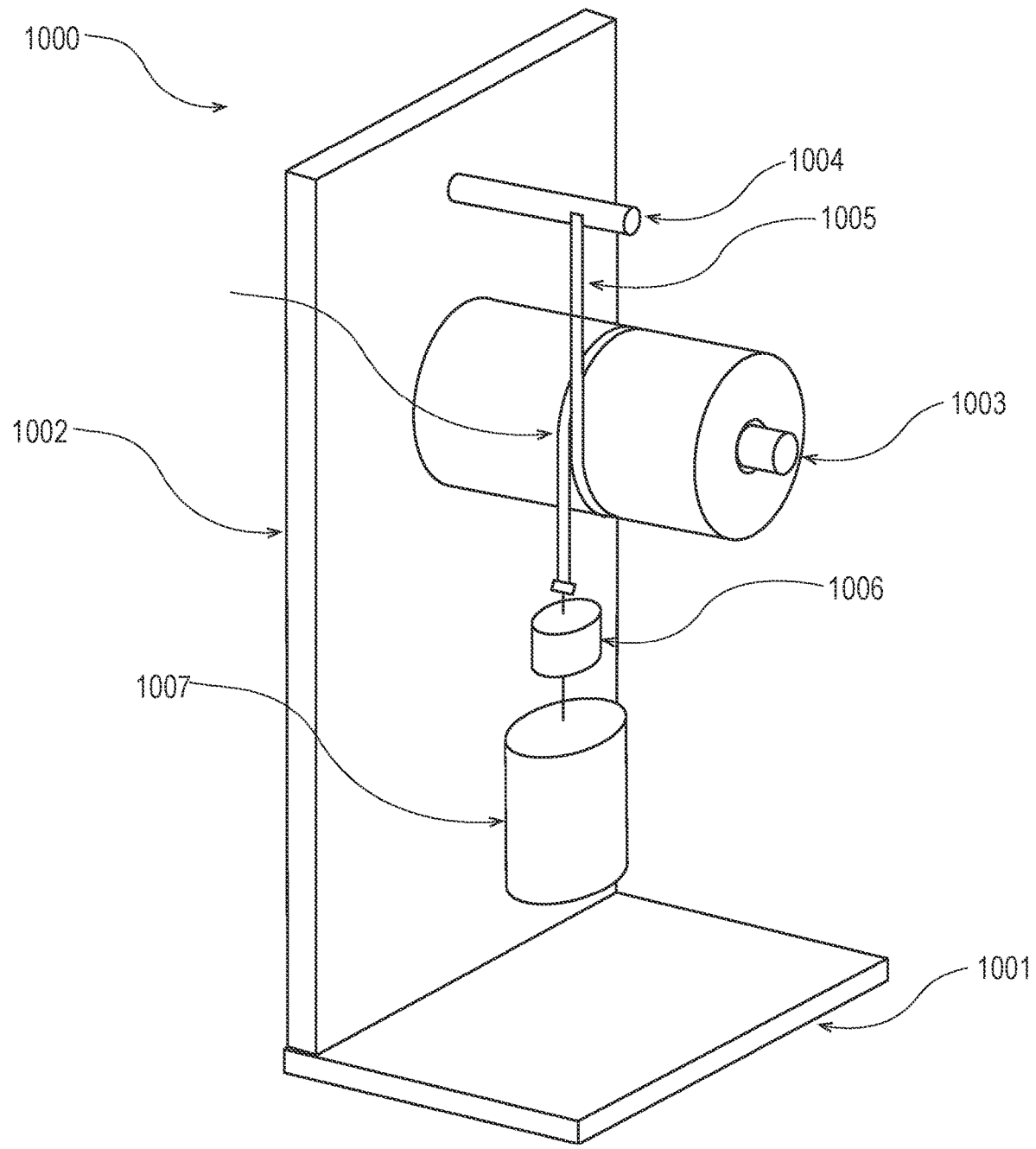

Percent Roll Compressibility (Percent Compressibility) is determined using a Roll Diameter Tester 1000 as shown in FIG. 9. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C. ° and about 50%±2% relative humidity.

The diameter of the test roll is measured directly using a Pi® tape or equivalent precision diameter tape (e.g. an Executive Diameter tape available from Apex Tool Group, LLC, Apex, N.C., Model No. W606PD) which converts the circumferential distance into a diameter measurement so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C.° and about 50% 35 2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate percent compressibility to the according to the following equation and record to the nearest 0.1%:

$$\% \text{ Compressibility} = \frac{(\text{Original Roll Diameter}) - (\text{Compressed Roll Diameter})}{\text{Original Roll Diameter}} \times 100$$

Repeat the testing on 10 replicate rolls and record the separate results to the nearest 0.1%. Average the 10 results and report as the Percent Compressibility to the nearest 0.1%.

A web material that forms finished products 500 of the present disclosure can have a Percent Compressibility of greater than 3.00% and/or greater than 3.50% and/or greater than 4.00% and/or greater than 4.22% and/or greater than 4.40% and/or greater than 4.50% and/or greater than 4.90% and/or greater than 5.00% and/or greater than 6.50% and/or greater than 7.35%.

All publications, patent applications, and issued patents mentioned herein are hereby incorporated in their entirety by reference. Citation of any reference is not an admission regarding any determination as to its availability as prior art to the claimed invention.

The dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An array of finished products, each finished product in said array having a Percent Compressibility of greater than 3.00%, an actual length ranging from about 10.955 inches to about 11.045 inches, wherein the finished products are paper towels, wherein the actual length is different for at least two finished products of the array, wherein at least one of the finished products of the array of finished products comprises a protruding core and wherein at least one of the finished products comprises a hidden core, and wherein each of the finished products are in a package.

2. The array of claim 1 wherein a length relative error is less than 0.60% of a target length, H.

3. The array of claim 2 wherein said length relative error is less than 0.30% of said target length, H.

4. The array of claim 1 wherein each finished product in said array having a core length relative error of less than 0.81% of a target length, H.

5. The array of claim 4 wherein said core length relative error is less than 0.75% of said target length, H.

6. The array of claim 5 wherein said core length relative error is less than 0.50% of said target length, H.

7. An array of finished products, each finished product in said array having a Percent Compressibility of greater than 3.00%, an actual length ranging from about 10.955 inches to about 11.045 inches, wherein the finished products are paper towels, wherein the actual length is different for at least three finished products of the array, and wherein at least one of the finished products of the array of finished products comprises a protruding core and wherein at least one of the finished products comprises a hidden core.

8. The array of claim 7 wherein a core length relative error is less than 0.60% of a target length, H.

9. The array of claim 8 wherein said core length relative error is less than 0.30% of said target length, H.

10. The array of claim 7 wherein each finished product in said array having a length relative error of less than 0.75% of a target length, H.

11. The array of claim 10 wherein each finished product in said array having said length relative error of less than 0.50% of said target length, H.

12. The array of claim 11 wherein each finished product in said array having said length relative error of less than 0.30% of said target length, H.

13. A collection of finished products, each finished product in said collection having a Percent Compressibility of greater than 3.00%, an actual length, wherein the actual length is different for at least two finished products of the array and wherein the actual length is the same for at least two finished products of the array, wherein at least one of the finished products of the array of finished products comprises a protruding core and wherein at least one of the finished products comprises a hidden core.

14. The collection of claim 13 wherein a length relative error is less than 0.81% of a target length, H.

15. The collection of claim 13 wherein each finished product in said array has a core length relative error of less than 0.81% of a target length, H.

16. The collection of claim 12 wherein at least two collections of finished products are placed proximate to one another to form an array.

17. The collection of claim 12 wherein each of said finished products are a paper material.

\* \* \* \* \*